United States Patent [19]

Suzuki

[11] Patent Number: 4,497,561
[45] Date of Patent: Feb. 5, 1985

[54] FOCUS DETECTION APPARATUS

[75] Inventor: Kenji Suzuki, Kawasaki, Japan

[73] Assignee: Canon Kabushiki Kaisha, Tokyo, Japan

[21] Appl. No.: 536,735

[22] Filed: Sep. 28, 1983

[30] Foreign Application Priority Data

Oct. 4, 1982 [JP] Japan .................. 57-174220

[51] Int. Cl.³ .............................................. G03B 3/10
[52] U.S. Cl. ................................. 354/406; 354/408
[58] Field of Search .............. 354/402, 406, 407, 408; 250/201, 204

[56] References Cited

U.S. PATENT DOCUMENTS 3,875,401 4/1975 Stauffer ............................ 250/201
4,253,752 3/1981 Ichihara .......................... 354/406
4,264,810 4/1981 Utagawa et al. ................. 250/204

Primary Examiner—Russell E. Adams
Attorney, Agent, or Firm—Fitzpatrick, Cella, Harper & Scinto

[57] ABSTRACT

A focus detection apparatus has at the rear side of an objective lens an imaging means which re-projects a first image of an object formed on the imaging plane as a plurality of second images of the object. The apparatus also has a light-receiving means which detects the relative positional relationship between the second images of the object so as to discriminate the focusing state of the objective lens. The light-receiving planes of the light-receiving means are shaped in the form of sine waves such that the outputs from the light-receiving means corresponding to the respective second object images become Fourier transforms.

10 Claims, 7 Drawing Figures

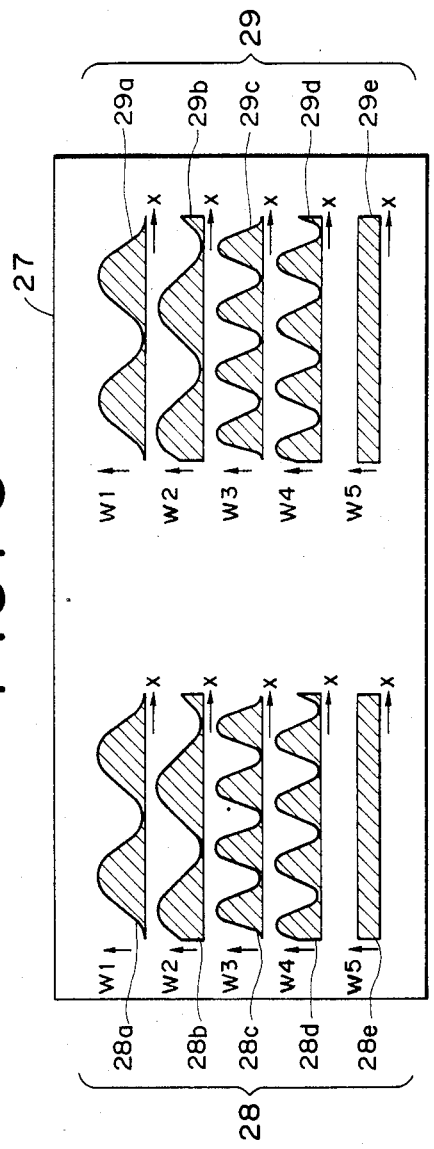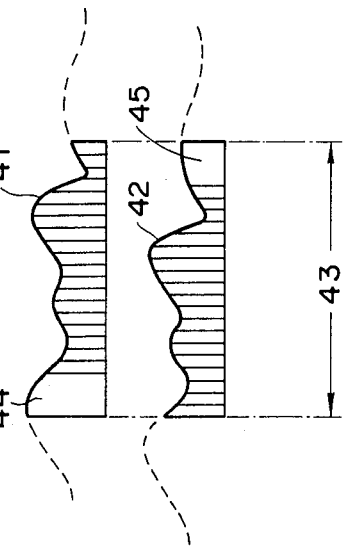

FOCUS DETECTION APPARATUS

BACKGROUND OF THE INVENTION

1. Field of the Invention

The present invention relates to a focus detection apparatus for use with an optical apparatus such as a camera and, more particularly, to a TTL type focus detection apparatus which detects the focusing state by an imaging light beam from a photographic lens in a single reflex camera.

2. Description of the Prior Art

Various types of focus detection apparatuses which may be used for single reflex cameras have been conventionally proposed. A focus detection method utilizing such as apparatus is disclosed, for example, in U.S. Pat. No. 3,875,401 (issued Apr. 1, 1975). According to this method, an imaging means is disposed at the rear side of the imaging plane of the photographic lens so as to reform the first object image formed on the imaging plane as a plurality of second object images. The focusing state of the phototaking lens is detected by detecting the relative positional relationship between the plurality of second object images.

FIG. 1 is a perspective view schematically showing a conventional focusing detection apparatus adopting such a focus detection method. Referring to FIG. 1, a field mask 13 having a slit-like opening 13a is disposed in the vicinity of an imaging plane 12 of a photo-taking lens 11. A field lens 14 is disposed immediately behind the field mask 13.

The object image, which is formed on the field mask 13 by the photo-taking lens 11, is reformd as the two second object images. The imaging lenses 15a and 15b form the two second object images on the basis of light beams L1 and L2 emerging from different positions of the exit pupil of the photo-taking lens 11 by means of the field lens 14. Light-receiving means 17a and 17b are disposed in the vicinity of an imaging plane 16 of the imaging lenses 15a and 15b. Each of the light-receiving means 17a and 17b comprises a plurality of photoelectric conversion elements (generally, self-scanning type Charge Coupled Devices).

Method for determining the relative positional relationship between the two second object images formed on the light-receiving surface of the light-receiving means 17a and 17b, respectively, in accordance with the light quantity distribution of each second object image, include a method for calculating a correlation amount in real space and a method for calculating a phase difference in frequency space.

The operation method in real space will first be described. When an nth output, that is, a sampling value from a plurality of photoelectric conversion elements of each of the light-receiving means 17a and 17b is designated as $a_n$ or $b_n$, the respective second object images formed on the light-receiving surface of the light-receiving means 17a and 17b are only shifted along the direction perpendicular to an optical axis L in accordance with the degree of de-focusing of the photo-taking lens 11, and have the same shape. Accordingly, we obtain:

$$b_n = a_{n-k} \tag{1}$$

where k is the relative displacement amount between the two second object images, which changes in accordance with the degree of de-focusing of the photo-taking lens 11. That is, K=0 when the photo-taking lens 11 is in focus. The purpose of the focusing state discrimination algorithm is basically the determination of the relative displacement amount k, and this may be achieved by introducing a shift-operation into the real space operation method. For example, a correlation amount is given as:

$$V(j) = \sum_n |a_n - b_{n+j}| \tag{2}$$

where j is the shift amount. When j=K, V(j)=0 from equation (1) above. Accordingly, if V(j) given by equation (2) is calculated for various values of j, the focusing state of the photo-taking lens 11 can be discriminated.

Since the sampling values of the light quantity distribution of each second object image from the photoelectric conversion elements are discrete, the relative displacement amount k between the two second object images may not necessarily be an integer multiple of the pixel pitch which is determined by the size of the photoelectric conversion elements. Data correction must be performed so as to determine the relative displacement amount k in terms of fractions of the pixel pitch. A complicated relation is frequently used as a correlation amount suitable for such correction. For example, U.S. Pat. No. 4,333,007 (issued June 1, 1982) discloses the operation method which uses the equation:

$$V(j) = \sum_n \{|a_n - b_{n+1+j}| - |a_{n+1} - b_{n+j}|\} \tag{3}$$

The operation method in frequency space will now be described. The Fourier transform of $a_n$ at a spatial frequency m is given by:

$$Am = (1/N) \sum_n^N a_n \exp(-2\pi mi/N) \tag{4}$$

where N is the number of pixels of each of the light-receiving means 17a and 17b and i is the imaginary number unit $\sqrt{-1}$. Using this Fourier transform, the Fourier transform Bm of $b_n$ at the spatial frequency m can be obtained from equation (1) as:

$$\begin{aligned}
Bm &= (1/N) \sum_n^N b_n \exp(-2\pi mi/N) \\
&= (1/N) \sum_n^N a_{n-k} \exp(-2\pi mi/N) \\
&= \exp(-i2\pi mk/N) \cdot Am
\end{aligned} \tag{5}$$

That is, when the two second object images change position relative to each other, their Fourier transforms differ from each other by a phase factor $\exp(-i2\pi mk/N)$. Since the phase difference $2\pi mk/N$ is proportional to each of the spatial frequency m and the relative displacement amount k, the focusing state of the photo-taking lens 11 can be discriminated by calculating the Fourier transforms of the respective images and comparing their phases. A method for electrically calculating Fourier transforms and for obtaining the relative displacement amount k of the second object images is disclosed, for example, in U.S. Pat. No. 4,264,810 (issued Apr. 28, 1981).

However, in any of such methods, the light quantity distribution of the second object images must be measured at a plurality of points. Accordingly, when the light-receiving means 17a and 17b comprise self-scanning type charge coupled devices (CCDs) each having a number of pixels, the following problems are encountered.

(i) Since a CCD has a different dark current and sensitivity for each pixel, good light quantity distribution data is hard to obtain with a CCD having a number of pixels. In the apparatus shown in FIG. 1, discrimination of the focusing state becomes unreliable with either of the methods described above. From a different point of view, a CCD which has a number of pixels and which also provides good data has a low yield and a high manufacturing cost. Accordingly, a conventional apparatus as shown in FIG. 1 becomes expensive if such a CCD is adopted.

(ii) Each of the methods described above requires a large number of operation steps and an expensive electrical processing unit. When the number of pixels of a CCD is designated by N, and the method of equation (3) is adopted in the apparatus shown in FIG. 1, $N^2$ operations and a 2N-byte random access memory are required. When the method of equation (5) is adopted in the apparatus shown in FIG. 1, a complex electrical circuit for calculating Fourier transforms is required.

(iii) A large amount of operation process impairs the real time discrimination of the focusing state. Extremely expensive hardware must be used so as to achieve real time processing.

(iv) In the apparatus shown in FIG. 1, in order to perform fine sampling, the pixel size of the light-receiving means must be decreased, resulting in an increase in the accumulating time of the light-receiving means. Then, the operation of the focusing apparatus of a camera of a general user becomes unstable.

SUMMARY OF THE INVENTION

The present invention has been made in consideration of this and has for its object to provide a focusing detection apparatus which has a light-receiving element with a smaller number of photoelectric conversion elements and which is capable of reducing the amount of operation process.

The above and other objects and advantages of the present invention will become apparent from the following description taken in conjunction with the accompanying drawings.

BRIEF DESCRIPTION OF THE DRAWINGS

FIG. 3 is a plan view showing a light-receiving means of the embodiment shown in FIG. 2;

FIG. 4 shows an output signal from the light-receiving means shown in FIG. 3;

DETAILED DESCRIPTION OF THE PREFERRED EMBODIMENTS

Figure 1:
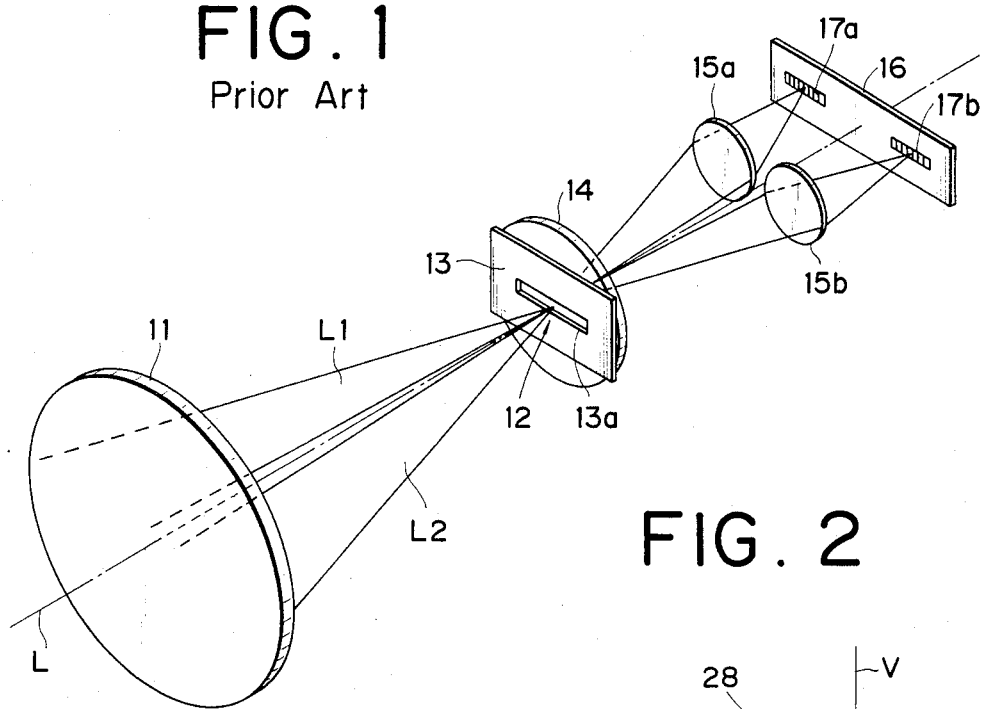
FIG. 1 is a perspective view schematically showing a conventional focusing detection apparatus.
Figure 2:
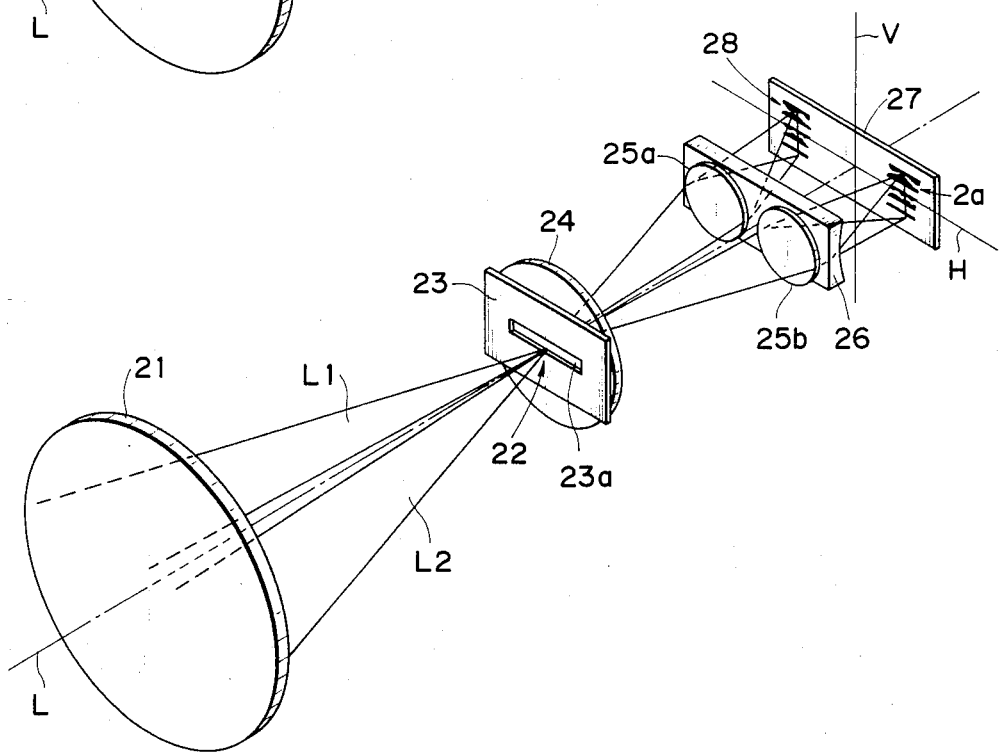
FIG. 2 is a perspective view schematically showing an embodiment of a focusing detection apparatus of the present invention.

Referring to FIG. 2, a photo-taking lens 21 has an imaging plane 22. A field mask 23 has a slit-like opening 23a. The optical system of the apparatus shown in FIG. 2 further includes a field lens 24 and imaging lenses 25a and 25b. The lenses have the same construction and functions as those shown in FIG. 1. An optical member 26 has a refracting power only in one direction. An imaging surface 27 of the imaging lenses 25a and 25b has light-receiving means 28 and 29.

The first object image is formed in the vicinity of the opening 23a of the field mask 23 by the photographic lens 21, is passed through the field lens 24, and is reformed as two second object images onto the light-receiving surface of the light-receiving means 28 and 29 on the imaging plane 27 through the optical member 26 by the two imaging lenses 25a and 25b. When the first object image formed by the photographic lens 21 is in focus, the two second object images are projected onto predetermined positions on the light-receiving surface of the light-receiving means 28 and 29. However, when the first object image formed by the photographic lens 21 is out of focus, the two second object images are projected as displaced in a direction H perpendicular to an optical axis L from their positions on the light-receiving means 28 and 29 corresponding to the in-focus state and along the direction of arrangement of the imaging lenses 25a and 25b. Accordingly, the focusing state of the photographic lens 21 may be detected by detecting the relative positions of the two second object images by means of the light-receiving means 28 and 29.

In this embodiment, two imaging lenses 25a and 25b are used. However, if more than two lenses are used, for example, if four lenses are used, the ranges of light beams $L_1$ and $L_2$ for forming the second object images may be selected in accordance with the F number of the photographic lens 21, which results in an improvement in focus detection precision.

The field lens 24 for focusing the imaging lenses 25a and 25b in the vicinity of the exit pupil of the photo-taking lens 21 is arranged in the vicinity of the imaging plane 22 of the photo-taking lens 21. Thus, the exit pupil of the photo-taking lens 21 is divided into a plurality of portions so that the second object images are formed by the light beams $L_1$ and $L_2$ passing through the divided portions of the pupil. In this manner, the second object images may be formed without interference, resulting in an improvement in focus detection precision. Since the field mask 23 has the slit-like opening 23a extending along the direction H, there is no interference between the two second object images. The optical member 26 is interposed between the first object image and the second object images and has a refracting power only in the direction V perpendicular to the direction H. The optical member 26 may comprise a cylindrical lens, a lenticular lens or the like. Although the refracting power of the optical member 26 is preferably of dispersing type, it may be of focusing type if the rest of the optical arrangement is selected properly. The second object images are formed to provide information on the light quantity distribution along the direction H in accordance with the focusing state of the photo-taking lens 21. However, the second object images have a uniform light quantity distribution along the direction V. This is for providing a uniform light quantity distribution to all of the plurality of photoelectric conversion elements arranged along the direction V of each of the light-receiving means 28 and 29.

The light-receiving means 28 and 29 respectively comprise five photoelectric conversion elements 28a to 28e and 29a to 29e, as shown in FIG. 3. Of the elements 28a to 28e and the elements 29a to 29e, corresponding ones of the elements 28a to 28d and the elements 29a to 29d at each end of the light-receiving plane have a sine wave shape of the same amplitude, and such that the effective width in the vertical direction (direction V in FIG. 2) periodically changes in accordance with the displacement along the horizontal direction (direction H in FIG. 2). However, the elements 28e and 29e have a rectangular wave shape having a width equal to half that of the elements 28a to 28d and 29a to 29d.

The relationship between the elements 28a to 28e and 29a to 29e will now be described. Since the elements 28a and 29a, 28b and 29b, 28c and 29c, and 28d and 29d respectively have the same shape, the relationship between the elements 28a to 28e only will be described. Of the elements 28a to 28e, the elements 28a and 28b have the same sine wave frequency and a phase shift of $\pi/2$ ($=90°$). Likewise, the elements 28c and 28d have the same sine wave frequency and a phase shift of $\pi/2$. The sine wave frequency of the elements 28a and 28b is set to be half that of the elements 28c and 28d. The length along the horizontal direction of the elements 28a to 28e is the same.

The x-coordinate is plotted for each of the elements 28a to 28e and 29a to 29e in the horizontal direction having the lower left end of each element as the origin. The sine wave frequency of the elements 28a and 28b and 29a and 29b is designated by $f_1$, the frequency of the elements 28c and 28d and 29c and 29d is designated by $f_2$, the effective width of the elements 28a and 29a is designated by $w_1$, the effective width of the elements 28b and 29b is designated by $w_2$, the effective width of the elements 28c and 29c is designated by $w_3$, and the effective width of the elements 28d and 29d is designated by $w_4$. Then, if $0 \leq w_1$ and $w_2, w_3, w_4 \leq 2$, the effective widths $w_1$ to $w_4$ can each be expressed as a function of x as follows:

$$w_1(x) = 1 - \cos 2\pi f_1 x \quad (6)$$

$$w_2(x) = 1 + \sin 2\pi f_1 x \quad (7)$$

$$w_3(x) = 1 - \cos 2\pi f_2 x \quad (8)$$

$$w_4(x) = 1 + \sin 2\pi f_2 x \quad (9)$$

When elements having such shapes are used, the electric outputs therefrom represent Fourier transform components of the object images incident thereon. This will be explained in further detail. When the light quantity at the position x of the second object image formed on the light-receiving plane of the element 28a by the imaging lens 25a is designated by a(x), an electrical output P(28a) from the element 28a may be obtained from equation (6) as:

$$P(28a) = \int a(x) w_1(x) dx \quad (10)$$
$$= \int a(x) dx - \int a(x) \cos 2\pi f_1 x \, dx$$

The second term on the right-hand side is the Fourier-consine-transform-component of the light quantity a(x) at the frequency $f_1$. However, since the first term on the right-hand side is a term representing the total light quantity, the elements 28e and 29e are incorporated so as to cancel this. As may be apparent from the foregoing description, the effective width $w_5$ of the elements 28e and 29e is given by:

$$w_5 = 1 \text{(constant)} \quad (11)$$

and an electrical output P(28e) from the element 28e when the light quantity at the position x of the second object image is a(x) is given by:

$$P(28e) = \int a(x) dx \quad (12)$$

Using this relation, the first term on the right-hand side of the equation (10) may be electrically cancelled so as to extract a correct Fourier-cosine-transform-component. Similarly, the element 28b can provide the Fourier-sine-transform-component at the frequency $f_1$ from the difference between its output P(28b) and the output P(28e) from the element 28e. When the cosine transfer component and the sine transfer component are obtained at the same frequency $f_1$, this is equivalent to obtaining the Fourier transform component as a complex number. When Fourier transfer components are obtained for the respective second object images, it is apparent that a phase difference between the two may be obtained, and the relative displacement amount between the two second object images may be obtained, from the principle described in U.S. Pat. No. 4,264,810 mentioned above. Since discrete sampling of the light quantity distribution is not performed in the present invention, the following equations are obtained in correspondence with the equations (1), (4) and (5);

$$b(x) = a(x - x_0) \quad (13)$$

$$A(f) = \int a(x) \exp(-i2\pi f x) dx \quad (14)$$

$$F(f) = \exp(i2\pi f x_0) A(f) \quad (15)$$

The calculation of the phase difference $\phi$ between the two second object images from the outputs from the light-receiving means 28 and 29 may be performed in the following manner. The Fourier transform component of one second object image at the frequency $f_1$ is designated as $Q_1$ and it is assumed that $Q_1 = C_1 + iS_1$. Then, since the Fourier-sine-transform-component is $\{P(28b) - P(28e)\}$ and the Fourier-cosine-transform-component is $\{P(28e) - P(28a)\}$, $$C_1 = P(28e) - P(28a)$$
$$S_1 = P(28b) - P(28e) \quad (16)$$

Similarly, $Q_2 = C_2 + iS_2$ for the other second object image is given from the outputs P(29a), P(29b) and P(29e). In general, when a division of two complex numbers is performed, the argument of the resultant quotient represents the phase difference between the original two complex numbers. Accordingly, the phase difference $\phi$ can be given as:

$$\phi = \arg\{Q_1/Q_2\} \quad (17)$$
$$= \tan^{-1}\{Im(Q_1/Q_2)/Re(Q_1/Q_2)\}$$

where Im(Z) and Re(Z) respectively represent the imaginary part and the real part of the complex number Z and are defined by:

$$Im(Q_1/Q_2) = S_1/S_2$$

$$Re(Q_1/Q_2) = C_1/C_2$$

The phase difference $\phi$ may alternatively be obtained by utilizing the outer product of vectors as disclosed in U.S. Pat. No. 4,264,310 mentioned above. The outer product $[Q_1, Q_2]$ of the two vectors $Q_1$ and $Q_2$ constituting the Fourier transform components of the two second object images at the frequency $f_1$ is given by:

$$[Q_1, Q_2] = C_1 S_2 - C_2 S_1 \tag{18}$$

Meanwhile, since $$[Q_1, Q_2] = |Q_1| \cdot |Q_2| \cdot \sin \phi \tag{19}$$

the phase difference $\phi$ can be obtained from the equations (18) and (19) above as follows:

$$\phi = \sin^{-1}\{(C_1 S_2 - C_2 S_1)/(|Q_1| \cdot |Q_2|)\} \tag{20}$$

for $$|Q_1| = \sqrt{C_1^2 + S_1^2} \tag{21}$$

$$|Q_2| = \sqrt{C_2^2 + S_2^2} \tag{22}$$

As may be apparent from the above, according to the principle of the present invention, the Fourier transform components need only be obtained for a single frequency $f_1$. Accordingly, if six elements 28a, 29a, 28b, 29b, 28e and 29e are used, the phase difference $\phi$ can be obtained and the focusing state of the photographic lens 21 can be discriminated. However, if the Fourier transform components are also obtained from the elements 28c, 29c, 28d, 28e and 29e at a frequency $f_2$, eratic operation is reduced, and focusing precision can be improved. The advantages obtained with this arrangement may be summarized as follows:

(i) The Fourier transform components have different values depending upon the frequency. When the calculation is performed only at a single frequency, no measurement can be taken when the Fourier transform component at this frequency happens to be smaller than noise.

(ii) At a higher frequency, the focused state can be detected with high precision. At a lower frequency, the ability to detect a large de-focusing amount is better. Thus, the detection ability varies depending upon the frequency. For this reason, the overall detection ability is improved if Fourier transform components are calculated at a plurality of frequencies.

(iii) When the origins of the two second object images are deviated from the designed origins due to alignment error, this is included in a phase difference. However, this error can be cancelled by using the difference between the phase differences $\phi_1$ and $\phi_2$ at the two frequencies $f_1$ and $f_2$.

From the viewpoint of the items enumerated above, better results are obtained if Fourier transform components are obtained at a larger number of frequencies. However, since a large number of elements above a certain number is a drawback, the Fourier transform components are preferably calculated at two to four frequencies.

When the photographic lens is significantly defocused, the two second object images are significantly displaced along the direction H in FIG. 3 and the common image does not become incident on the light-receiving means 28 and 29 at the edges of the field of view. FIG. 4 shows the images of the light-receiving means 28 and 29 formed in such a case. Referring to FIG. 4, a light quantity distribution 41 corresponds to one second object image while a light quantity distribution 42 corresponds to the other second object image. The light-receiving means 28 and 29 each have an effective field of view 43. Since the light quantity distribution 41 is shifted to the right relative to the light quantity distribution 42, the common image is obtained only in the hatched portion. Thus, non-hatched portions 44 and 45 are images which are included in only one of the two second object images. Thus, the images are not only displaced relative to each other but also have different light quantity distributions. This is contradictory to the presupposition of the image shift detection method adopted in the embodiment: "two object images are shifted from each other only in position and have the same light quantity distribution curve". For this reason, in this embodiment, one of the following methods must be used to solve this problem.

Figure 5:
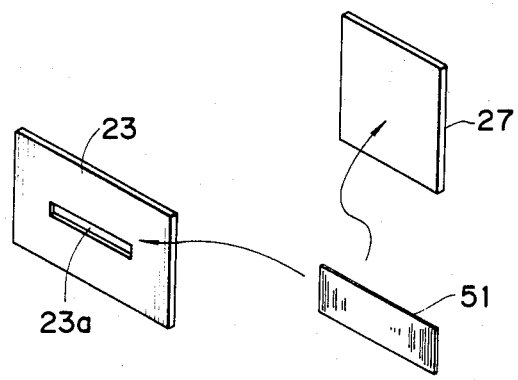
FIG. 5 is a plan view showing the relationship between a field mask and a filter of the embodiment shown in FIG. 2.

According to a first method, a mask 51 is arranged in the opening 23a or on the light-receiving planes of the light-receiving means 28 and 29, as shown in FIG. 5. The mask 51 has a light transmission factor which gradually decreases from the center of the second object image toward the edge thereof. Since an image portion which is not common to the two second object images always enters the field of view from the edge thereof, the mask 51 which serves to darken the edge of the field of view is effective.

Figure 6:
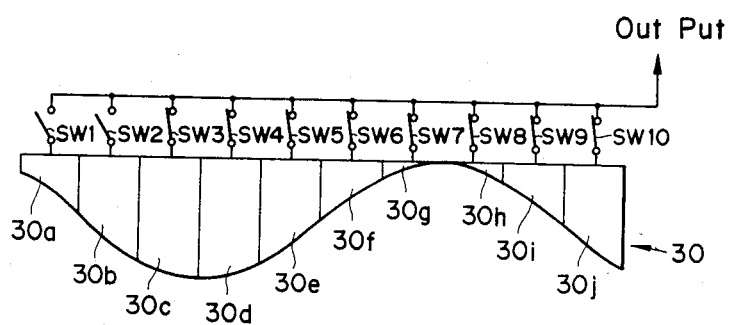
FIG. 6 is a plan view showing another example of the light-receiving means.

According to a second method, a photoelectric conversion element 30 is divided into a number of subpixels 30a to 30j and effective light-receiving lengths are switched by switches $SW_1$ to $SW_{10}$ arranged in correspondence with the subpixels 30a to 30j, as shown in FIG. 6. Although the element 30 is divided into a number of subpixels 30a to 30j, all the outputs from the subpixels 30a to 30j are not necessarily used. For example, in the example shown in FIG. 6, the rightmost eight subpixels 30c to 30j are connected to one output line to equivalently constitute a single, long photoelectric element.

Figure 7:
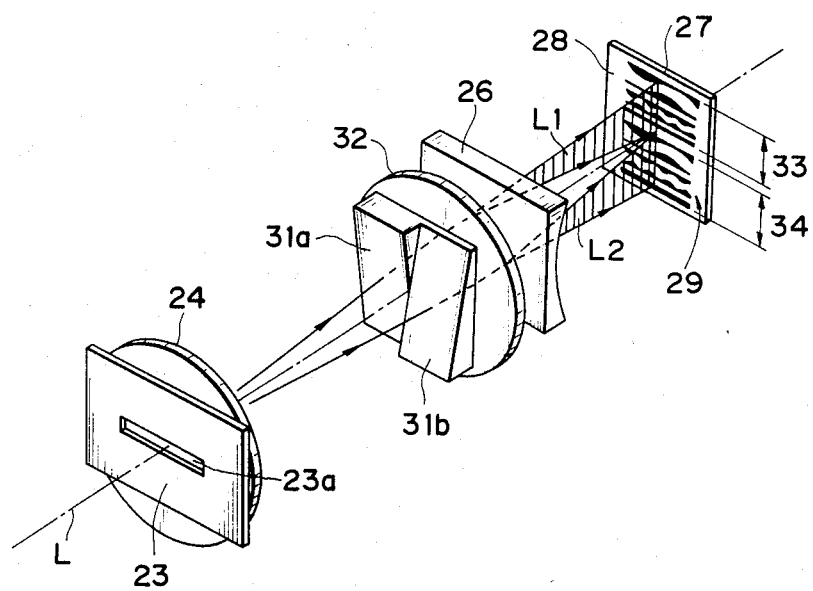
FIG. 7 is a perspective view schematically showing another embodiment of a focusing detection apparatus of the present invention.

FIG. 7 is a perspective view schematically showing another embodiment of the present invention. Referring to FIG. 7, the photographic lens 21 is not shown. The same reference numerals as used in FIG. 3 denote the same parts in FIG. 7 and a detailed description thereof will be omitted. In this embodiment, only one second imaging lens 32 is arranged. Division of the light into two light beams $L_1$ and $L_2$ for obtaining the two second object images is performed by two prisms 31a and 31b arranged in front of the imaging lens 32. The light beam $L_1$ emerging from the prism 31a reaches a region 33 of a second imaging plane 27 in which a light-receiving means 28 is arranged. The light beam $L_2$ emerging from the prism 31b similarly reaches a region 34 wherein a light-receiving means 29 is arranged. Each of the light-receiving means 28 and 29 comprises five elements, 28a to 28e and 29a to 29e, respectively, as in the embodiment shown in FIG. 3.

In this embodiment, in order to extract the Fourier transform components of the light quantity distribution by the light receiving characteristics of the photoelectric conversion elements, the shape at one end of the light-receiving plane of each photoelectric conversion element varies sinusoidally. However, the same photoelectric conversion outputs may be obtained if a filter is arranged for sinusoidally changing the transmission factor on a photoelectric conversion element of a given width. This filter may be of density type or of area type.

In summary, according to the present invention, the focusing state may be detected with a small number of photoelectric conversion elements and with a small amount of operation process. The focus detection apparatus of the present invention has a simple construction and can quantitatively detect the amount of image shift. The apparatus can detect the difference between a near-focus and a far-focus and the amount of de-focusing.

What I claim is:

1. A focus detection apparatus comprising:
   (a) first optical means;
   (b) second optical means for reforming a first object image formed on an imaging plane of said first optical means as a plurality of second object images; and
   (c) light-receiving means for receiving signals necessary for discriminating a focusing state of the first object image formed on the light-receiving surface of said first optical means in accordance with a positional relationship between said plurality of second object images, said light-receiving means having at least one photoelectric conversion element having a sinusoidally shaped light-receiving surface.

2. An apparatus according to claim 1, wherein said light-receiving means has at least one of first and second photoelectric conversion elements, respectively, which have sinusoidally-shaped light-receiving surfaces of sine wave shapes of the same frequency and amplitude, and the sine waves have a phase difference of $\pi/2$.

3. An apparatus according to claim 1, wherein said light-receiving means has at least one of first and second photoelectric conversion elements, respectively, which have light-receiving surfaces of a sine wave shapes of the same frequency and amplitude, and the sine waves have a phase difference of $\pi/2$, and also has at least one third photoelectric conversion element which has a rectangular light-receiving plane.

4. An apparatus according to claim 1, wherein said light-receiving means has at least one of first and second photoelectric conversion elements, respectively, which have light-receiving surfaces of sine wave shapes of the same frequency and amplitude, and the sine waves have a phase difference of $\pi/2$, at least one of third and fourth photoelectric conversion elements, respectively, which have the same relationship as that of said first and second photoelectric conversion elements at a frequency different from the frequency of the sine waves of said first and second photoelectric conversion elements, and at least one fifth photoelectric conversion element having a rectangular light-receiving surface.

5. An apparatus according to claim 1, further comprising:
   (d) third optical means having a refracting power in a direction perpendicular to a direction of relative displacement of said plurality of second object images, said third optical means being interposed between said second optical means and said light-receiving means.

6. An apparatus according to claim 2, further comprising:
   (d) third optical means having a refracting power in a direction perpendicular to a direction of relative displacement of said plurality of second object images, said third optical means being interposed between said second optical means and said light-receiving means.

7. An apparatus according to claim 3, further comprising:
   (d) third optical means having a refracting power in a direction perpendicular to a direction of relative displacement of said plurality of second object images, said third optical means being interposed between said second optical means and said light-receiving means.

8. An apparatus according to claim 4, further comprising:
   (d) third optical means having a refracting power in a direction perpendicular to a direction of relative displacement of said plurality of second object images, said third optical means being interposed between said second optical means and said light-receiving means.

9. An apparatus according to claim 5, wherein the refracting power of said third optical member is of dispersing type.

10. An apparatus according to claim 9, wherein said third optical means comprises one of a cylindrical lens and a lenticular lens.

* * * * *

UNITED STATES PATENT AND TRADEMARK OFFICE
CERTIFICATE OF CORRECTION

PATENT NO. : 4,497,561

DATED : February 5, 1985

INVENTOR(S) : KENJI SUZUKI

It is certified that error appears in the above-identified patent and that said Letters Patent is hereby corrected as shown below:

Column 2, line 1, "K = 0" should read --k = 0--;
         line 12, "j - K," should read --j = k,--;
         line 42, "$\sqrt{}-1$" should read -- $\sqrt{-1}$ --.

Column 7, line 8, "4,264,310" should read --4,264,810--.

Column 9, line 41, Claim 3, delete "a".

Column 10, line 44, Claim 9, "member" should read --means--.

Signed and Sealed this

Twenty-first Day of January 1986

[SEAL]

Attest:

DONALD J. QUIGG

Attesting Officer     Commissioner of Patents and Trademarks